United States Patent
Siulinski

(10) Patent No.: US 8,230,126 B2
(45) Date of Patent: Jul. 24, 2012

(54) CAMERA SHUTTER CONTROL THROUGH A USB PORT OR AUDIO/VIDEO PORT

(75) Inventor: James A. Siulinski, Westbrook, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 102 days.

(21) Appl. No.: 12/606,562

(22) Filed: Oct. 27, 2009

(65) Prior Publication Data

US 2011/0099300 A1   Apr. 28, 2011

(51) Int. Cl.
*G06F 3/00* (2006.01)
*G06F 13/00* (2006.01)

(52) U.S. Cl. ............ 710/15; 710/5; 710/8; 710/32; 710/36

(58) Field of Classification Search .......... None
See application file for complete search history.

(56) References Cited

U.S. PATENT DOCUMENTS

2008/0150512 A1*  6/2008  Kawano ............... 323/351
2009/0198841 A1*  8/2009  Yoshida et al. ......... 710/16

OTHER PUBLICATIONS

USB OTG Mechanical Presentation, Feb. 26, 2002, USB.org [online, accessed on Jun. 3, 2011] URL: http://www.usb.org/developers/onthego/london/OTG_mechanical.pdf.*
"USB Remote Cable", [Online]. Retrieved from the Internet: <URL: http://chdk.wikia.com/wiki/USB_Remote_Cable>, (Jun. 9, 2009), 4 pgs.

* cited by examiner

*Primary Examiner* — Tariq Hafiz
*Assistant Examiner* — Scott Sun
(74) *Attorney, Agent, or Firm* — Schwegman, Lundberg & Woessner, P.A.

(57) ABSTRACT

An apparatus comprises a digital image sensor, a communication port, a detection circuit and a processor. The detection circuit is configured to detect a change in electrical resistance at a connector of the communication port. The processor is configured to initiate an operation of the apparatus according to the detected change in resistance.

17 Claims, 3 Drawing Sheets

CAMERA SHUTTER CONTROL THROUGH A USB PORT OR AUDIO/VIDEO PORT

BACKGROUND

Since their introduction, there are many types of digital cameras available. Some are quite inexpensive while some are geared toward the higher end market for professional photographers or those consumers that buy higher-end devices after researching the item. It is desirable to provide some of the capabilities of the higher end cameras for lower-end cameras.

OVERVIEW

This document relates generally to systems, devices, and methods for inexpensively adding to the capability of digital cameras. An apparatus example includes a digital image sensor, a communication port, a detection circuit, and a processor. The detection circuit is configured to detect a change in electrical resistance at a connector of the communication port. The processor is configured to initiate an operation of the apparatus according to the detected change in resistance.

A method example includes detecting a change in resistance at a connector of a communication port of a device including a digital image sensor, and initiating an operation of the device in response to the detected change in resistance.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document relates generally to systems, devices, and methods for inexpensively adding to the capability of digital cameras. In particular, this document relates to providing inexpensive options such as shutter release to digital cameras.

Figure 1:
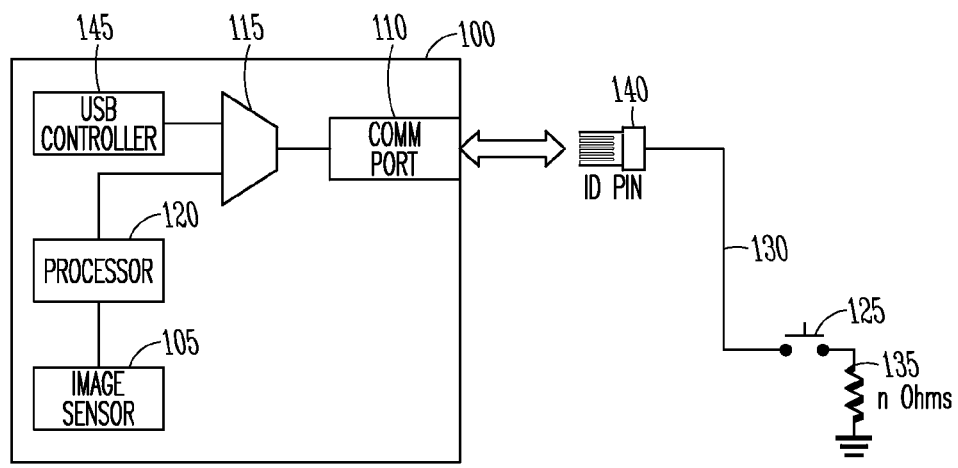
FIG. 1 is a block diagram of portions of a device having a digital image sensor.

FIG. 1 is a block diagram of portions of a device 100 having a digital image sensor 105. An example of such a device is a digital camera or a cell phone. The device 100 also includes a communication port 110. The device 100 also includes a detection circuit 115 in electrical communication with the communication port 110. The detection circuit 115 is configured to detect a change in electrical resistance at a connector of the communication port 110.

Figure 2:
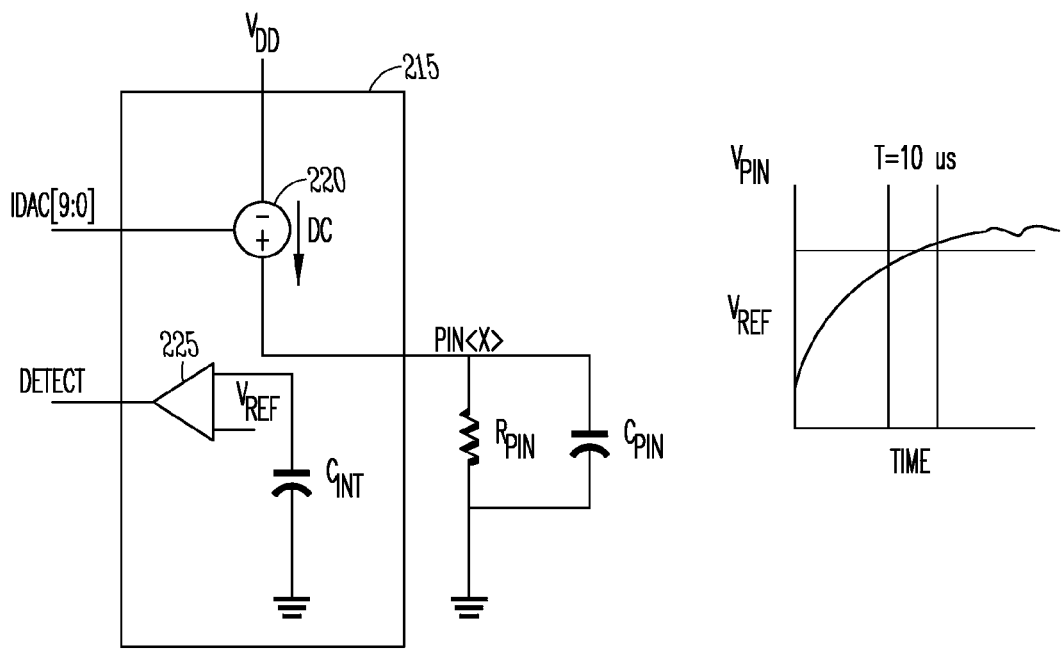
FIG. 2 is a block diagram of portions of an example of a detection circuit.

FIG. 2 is a block diagram of portions of an example of a detection circuit 215. The resistor and capacitor $R_{PIN}$ and $C_{PIN}$ represent the impedance seen at a conducting terminal of a jack plug. The detection circuit 215 also includes a controllable current source 220 and a comparator 225. The current source 220 outputs (e.g., sources or sinks) a current that is proportional to the digital value (idac[9:0]) of an identification register. To determine the resistance of a conducting terminal, the digital value of the identification register is changed (e.g., increased) and provides current proportional to the digital value to $R_{PIN}$ to create a voltage $V_{PIN}$ at an input of the comparator 325. When $V_{PIN}$ is approximately equal to $V_{REF}$, a detect signal is generated by the detection circuit. The value of $R_{PIN}$ is determined from the known value of $V_{REF}$ and the value of current value corresponds to the digital value in the identification register.

The combined capacitance seen at the conducting terminal is the conduction terminal capacitance $C_{PIN}$ and the internal capacitance of the connection $C_{INT}$. Because of this capacitance, there is a time constant associated with the voltage $V_{PIN}$ reaching its final value. The time for $V_{PIN}$ to reach 50% of its final value is $0.7R_{PIN}*(C_{PIN}+C_{INT})$. The detection circuit 215 allows enough time for $V_{PIN}$ to stabilize between measurements before changing the value of the identification register. In certain examples, the same detection circuit 215 is used to determine the resistance of multiple conducting terminals, such as by using a switch circuit to switch different terminals to the detection circuit input. In certain examples, a different detection circuit 215 is included for each conducting terminal.

Returning to FIG. 1, the device 100 also includes a processor 120 communicatively coupled to the digital image sensor 105, the communication port 110, and the detection circuit 115. The communicative coupling allows signals to be communicated between the processor 120 and one or more of the communication port 110, the image sensor, and the detection circuit 115 even though there may be intervening circuitry. In some examples, the processor 120 is a microprocessor. In some examples, the processor 120 is application specific integrated circuit (ASIC). The processor 120 executes instructions in software and/or firmware to perform the function described herein. The software and/or firmware are contained in modules. One or more functions may be performed by a module.

To measure a resistance at a connector, the processor 120 changes the value in the identification register until a detect signal is received from the detection circuit 115. In some examples, the identification register is integral to the processor 120. In certain examples, the identification register is included in a logic circuit between the processor 120 and the detection circuit 115. The processor 120 initiates an operation of the device 100 according to the detected change in resistance.

For instance, the device 100 may include a camera shutter and a camera aperture to control exposure of the digital image sensor 105, and the processor 120 may be a camera control processor. According to a specified resistance value detected by the detection circuit 115 at the connector, the processor 120 initiates at least one of an operation of the camera shutter (e.g., one or both of opening and closing the shutter), a change in a camera shutter speed, or a changing of a size of the aperture.

To change the resistance at the connector and thereby initiate an operation in the device, a user depresses a switch 125 (or other type of user-operated actuator) included in a cable 130 or wire attachable to the communication port 110. Activating the switch 125 changes the resistance at the connector of the communication port 110, such as by adding a resistor 135 in parallel with a resistance at the connector.

According to some examples, the communication port 110 includes a universal serial bus (USB) port, and the detection circuit 115 detects the change in resistance at a pin connector of the USB port. In some examples, a USB-compatible connector 140 is attached to the cable 130 and the cable 130 is USB-compatible. The USB-compatible connector 140 may include a resistance connected to the an identification (ID) pin of the USB compatible connector and activating the switch 125 changes the resistance seen by the detection circuit 115 at the connector for the ID pin.

In some examples, the device 100 includes a USB controller 145 communicatively coupled to the processor 120. In normal operation the USB Controller 145 controls the operation of the USB port. In some examples, the USB controller 145 communicates via the USB using a USB on-the-go (OTG) protocol. The OTG standard typically includes use of micro-AB type of plug receptacle. The AB type of plug receptacle can accept either a micro-A plug or a micro-B plug. In certain examples, the USB-compatible connector is one of a micro-AB type connector, a micro-A type connector, or a micro-B type connector. The ID pin is typically the fifth pin of the connector. In certain examples, the cable 130 is compatible with a micro-AB type connector, a micro-A type connector, or a micro-B type connector. In certain examples, the USB-compatible connector 140 includes an adapter to allow for connection to other plug type USB cables, such as standard-A for example.

The processor 120 normally does not interfere with communications via the USB until the user wants the device to perform on the operations controllable by changing the resistance. In some examples, when a change in resistance is detected on the ID pin connector an interrupt may be exchanged between the processor 120 and the USB controller 145. The USB controller 145 may then ignore signals on the USB port for a period of time or until a subsequent interrupt is received from the processor 120. This allows OTG devices to be attached to the communication port 110 in place of the cable assembly, or allows normal communications over the other pins of the connector 140.

Figure 3:
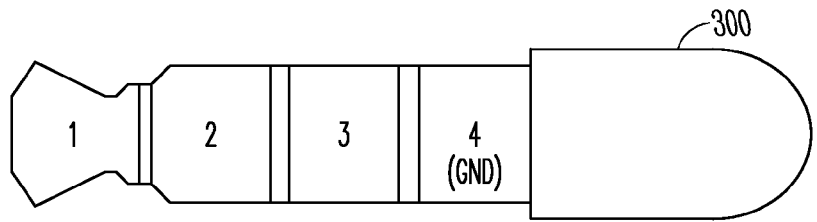
FIG. 3 is an illustration of an example of a jack plug of an audio jack or a video jack connector.

According to some examples, the communication port 110 includes an audio or a video jack connector to receive an audio or a video jack plug of a separate device. FIG. 3 is an illustration of an example of a jack plug 300 of an audio jack or a video jack connector. An audio or video jack connector is sometimes called a TRS connector. The letters "TRS" stand for tip, ring and sleeve conducting terminals. In some examples, an audio or video jack connector may be a TS connector having only the tip and sleeve conducting terminals. In the example shown in FIG. 3, the audio or video jack connector has four conducting terminals and can be called a TRRS connector for the tip, ring, ring, and sleeve connections. The communication port includes a connector having an electrical contact for connection to a conducting terminal of the plug.

A jack plug can be included as part of an audio visual (A/V) cable. The cable can include the switch 125 and resistor 135 of FIG. 1. Activating the switch can change the resistance seen at one of the conducting terminals, such as one of the ring conducting terminals for example. The detection circuit is configured to detect a change in resistance at the conducting terminal.

Figure 4:
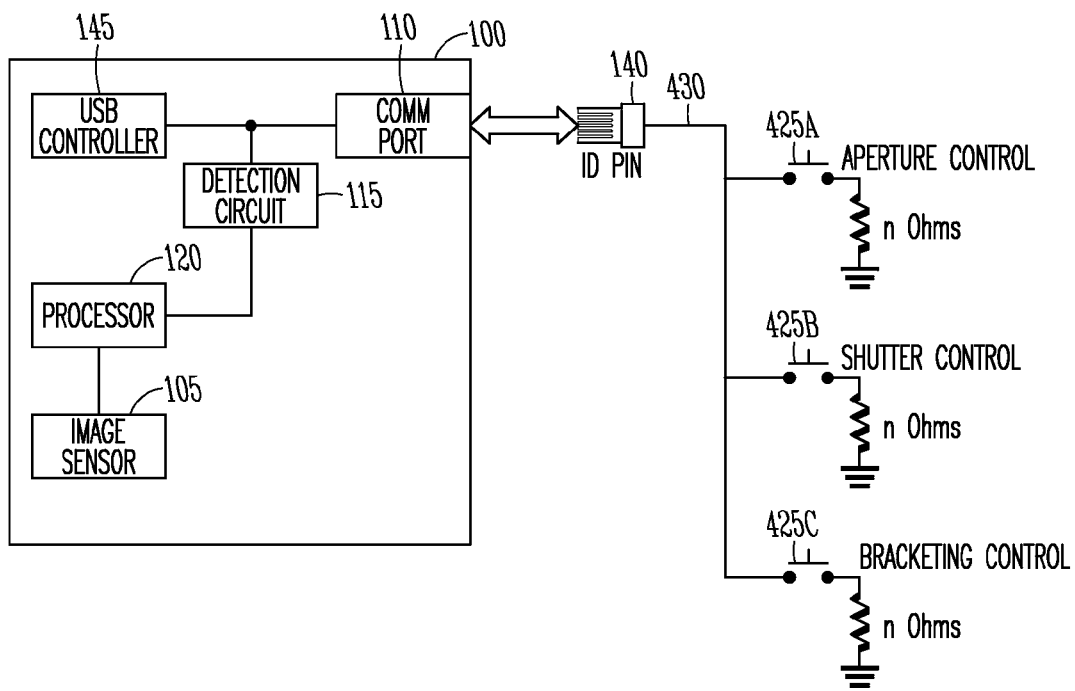
FIG. 4 shows an example of a device attached to a cable or wire having multiple switches.

According to some examples, different resistance values can be switched onto the connector of the communication port 110. FIG. 4 shows an example where the device 100 is attached to a cable 430 or wire having multiple switches 425A, 425B, and 425C. Activating any one of the switches changes the resistance seen at the connector of the communication port 110. A digital value corresponding to the resistance values is stored in the identification register. For instance, in the example shown, resistances are provided that correspond to operation involving control of the aperture, control of the shutter for the image sensor, and for control of a bracketing operation.

Bracketing an image is a technique in film photography is to improve the range of exposure of an image by "bracketing" an image. Bracketing an image involves taking multiple exposures of the image. Usually three exposures are taken in quick succession. One picture is exposed with the default exposure settings suggested by the camera's exposure control circuits. Two additional exposures are taken of the image; one with a longer exposure than the default settings, and one with a shorter exposure than the default settings. In certain examples, the images are stored in a memory of the device 100. The memory may be integral to the processor 120 or may be a separate memory, such as a removable memory card. The photographer then either chooses the most satisfactory exposure of the three, or uses imaging techniques on a computer to blend a combination of the three exposures into one optimized image.

A resistance of 4 k$\Omega$ may be used to identify the aperture control operation, a resistance of 5.62 k$\Omega$ may be used to identify the shutter control operation, and a resistance of 7.87 k$\Omega$ may be used to identify the bracketing operation. One of the operations corresponding to the resistance value is initiated by the processor 120.

In some examples, the path of the ID pin of connector 140 is monitored by the detection circuit 415 and is not required by the USB controller 145. The ID pin may be monitored by the USB controller 145 when the device 100 is an OTG host device.

According to some examples, the device 100 includes a video port communicatively coupled to the processor 120. The video port may be used to connect to a second device such as a video display or monitor. The processor 120 may include a video module to process video information. The video module processes video information which may include providing video information via the video port to the second device. Based on a specified resistance detected by the detection circuit 115, the processor 120 initiates an operation of the video port according to the detected resistance value. Examples of video operations include initiating one or more of a slideshow of images stored in a memory of the apparatus, a pause in display of video information, or a rewind of the video information for display. Which operation is initiated by the processor 120 depends on the value of the resistance detected at the connector 140.

In some examples, the video port includes a high-definition multimedia interface (HDMI). The processor 120 is configured to initiate an operation at the HDMI according to the detected resistance value. This allows for control of the HDMI by the device 100 according to a switched resistance value.

Figure 5:
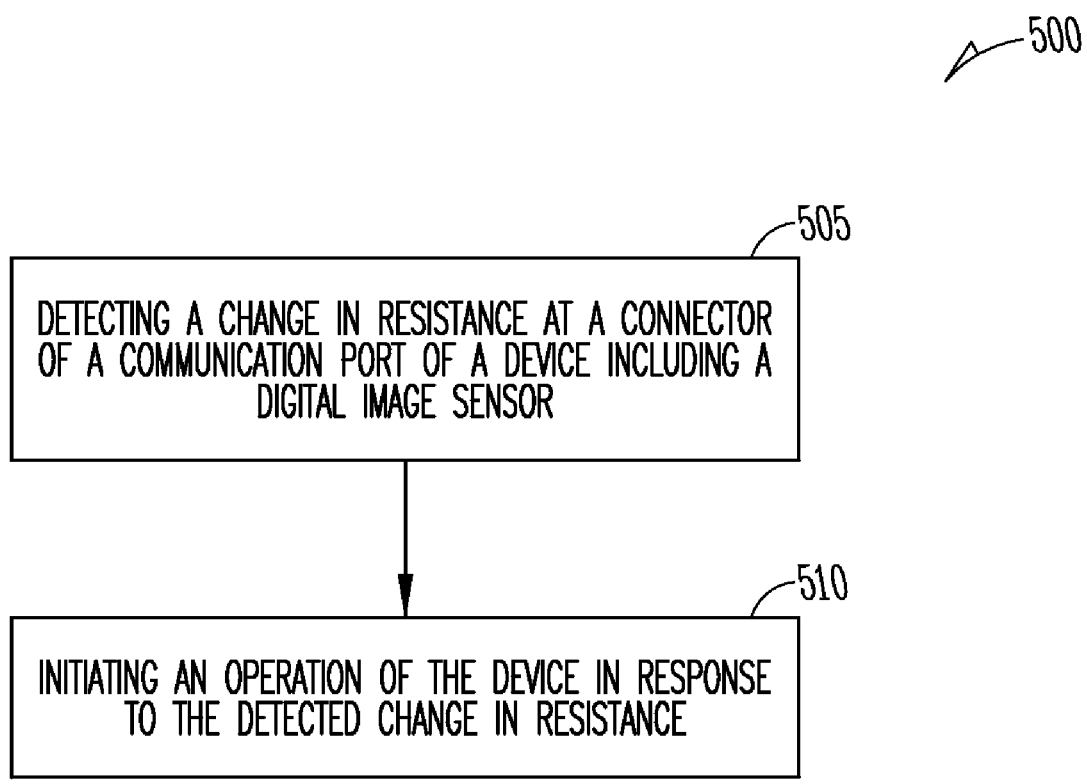
FIG. 5 is a flow diagram of a method of controlling a device having a digital image sensor.

FIG. 5 is a flow diagram of a method of controlling a device having a digital image sensor, such as a digital camera, PDA, or cell phone for example. At block 505, a change in resistance is detected at a connector of a communication port of the device. At block 510, an operation of the device is initiated in response to the detected change in resistance.

The systems, devices, and methods described herein show how control of a device having a digital image sensor (e.g., a digital camera) can be controlled though the USB connector or an audio/video jack to provide additional capability such as shutter release. This allows features found on expensive device to be added to cheaper cameras without the cost and real estate of an additional connector or a wireless communication approach.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAM's), read only memories (ROM's), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
a digital image sensor;
a camera shutter;
a camera aperture;
a communication port;
a detection circuit in electrical communication with the communication port, wherein the detection circuit is configured to detect a specified resistance value at a connector the communication port; and
a processor communicatively coupled to the digital image sensor, the communication port, and the detection circuit, wherein the processor is configured to initiate, according to the detected resistance value, at least one of an operation of the camera shutter, a change in a camera shutter speed, or a changing of a size of the aperture.

2. The apparatus of claim 1, wherein the communication port includes a universal serial bus (USB) port, and wherein the detection circuit is configured to detect the change in resistance at a pin connector of the USB port.

3. The apparatus of claim 2, including a USB controller communicatively coupled to the processor, wherein the USB controller is configured to communicate via the USB using a USB on-the-go (OTG) protocol, and wherein the detection circuit is configured to detect the change in resistance on an identification (ID) pin of the USB port.

4. The apparatus of claim 2, including a USB-compatible cable, wherein the USB-compatible cable includes a switch and at least one resistor coupled to the switch, wherein closing the switch changes the resistance at the pin connector.

5. The apparatus of claim 1, wherein the communication port includes at least one of an audio or a video jack connector to receive an audio or a video jack plug of a separate device,
wherein the connector includes an electrical contact for connection to a conducting terminal of the plug, and
wherein the detection circuit is configured to detect a change in resistance at the conducting terminal.

6. The apparatus of claim 1, including a memory communicatively coupled to the processor,
wherein the detection circuit is configured to detect a specified resistance value at the connector, and
wherein the processor is configured to initiate, according to the detected resistance value, storage of bracketing images in the memory.

7. The apparatus of claim 1, including a video port communicatively coupled to the processor,
wherein the detection circuit is configured to detect a specified resistance value at the connector,
wherein the processor includes a video module configured to process video information including providing video information via the video port, and
wherein the processor is configured to initiate an operation of the video port according to the detected resistance value.

8. The apparatus of claim 7, wherein the processor is configured to initiate, according to the detected resistance value, a slideshow of images stored in a memory of the apparatus, a pause in display of video information, or a rewind of the video information for display.

9. The apparatus of claim 7, wherein the video port includes a high-definition multimedia interface (HDMI), and wherein the processor is configured to initiate an operation at the HDMI according to the detected resistance value.

10. The apparatus of claim 1, wherein the apparatus is included in a cell phone.

11. A method comprising:
   detecting, at a connector of a communication port of a device including a digital image sensor, a specified resistance value while a connection to the connector is maintained; and
   initiating, in response to the detected resistance value, at least one of an operation of a device shutter, a change in an aperture of the device, a change in a shutter speed of the device, and an image bracketing operation of the device.

12. The method of claim 11, wherein detecting a change in resistance at a connector of a communication port of a device includes detecting a change in resistance at a conducting terminal of an Audio/Video jack connector of the device.

13. The method of claim 11, wherein detecting a change in resistance at a connector of a communication port of a device includes detecting a change in resistance at a pin connector of a universal serial bus (USB) port of the device.

14. The method of claim 13, wherein detecting a change in resistance at a pin connector of a universal serial bus (USB) port includes detecting a change in resistance at an identification (ID) pin of the USB port.

15. The method of claim 11, wherein the device including the image sensor is a first device,
   wherein the method includes providing video output from the first device to a second device and initiating a video display operation by the first device.

16. The method of claim 15, wherein the video display operation includes at least one of: starting a slideshow of images stored in a memory of the first device, pausing a display of video information by the first device, or rewinding the video information to be displayed by the first device.

17. The method of claim 11, including providing a user-operated actuator for attachment to the connector, wherein the user-operated actuator is configured to change the resistance at the connector when actuated by the user.

* * * * *